United States Patent
Skriletz (10) Patent No.: US 8,250,534 B2
(45) Date of Patent: Aug. 21, 2012

(54) METHOD AND SYSTEM FOR CONSTRUCTING A SOFTWARE APPLICATION FROM A COMPLETE AND CONSISTENT SPECIFICATION IN A SOFTWARE DEVELOPMENT PROCESS

(75) Inventor: Richard A. Skriletz, Portland, OR (US)

(73) Assignee: Infonovus Technologies, LLC, Portland, OR (US)

( * ) Notice: Subject to any disclaimer, the term of this patent is extended or adjusted under 35 U.S.C. 154(b) by 1026 days.

(21) Appl. No.: 12/189,305

(22) Filed: Aug. 11, 2008

(65) Prior Publication Data
US 2009/0094272 A1   Apr. 9, 2009

(51) Int. Cl.
*G06F 9/44* (2006.01)
*G06F 9/45* (2006.01)

(52) U.S. Cl. .................... 717/121; 717/105; 717/109

(58) Field of Classification Search .......... 717/104–110, 717/122–123
See application file for complete search history.

(56) References Cited

U.S. PATENT DOCUMENTS

| | | | |
|---|---|---|---|
| 5,875,330 A * | 2/1999 | Goti ............................. | 717/104 |
| 5,875,333 A | 2/1999 | Fish et al. | |
| 6,349,404 B1 | 2/2002 | Moore et al. | |
| 6,389,588 B1 | 5/2002 | Wadhwa et al. | |
| 6,473,748 B1 | 10/2002 | Archer | |
| 6,601,233 B1 | 7/2003 | Underwood | |
| 6,721,941 B1 | 4/2004 | Morshed et al. | |
| 6,757,887 B1 | 6/2004 | Kaplan et al. | |
| 6,789,252 B1 | 9/2004 | Burke et al. | |
| 6,889,371 B1 | 5/2005 | Teig et al. | |
| 6,889,375 B1 * | 5/2005 | Chan et al. ..................... | 717/123 |
| 6,898,783 B1 * | 5/2005 | Gupta et al. ................... | 717/105 |
| 7,047,518 B2 | 5/2006 | Little et al. | |
| 7,114,149 B2 * | 9/2006 | Aptus et al. .................... | 717/123 |
| 7,197,739 B2 * | 3/2007 | Preston et al. ................. | 717/106 |
| 7,213,232 B1 | 5/2007 | Knowles | |
| 7,346,888 B1 * | 3/2008 | Srinivasan et al. ............ | 717/105 |
| 7,424,701 B2 * | 9/2008 | Kendall et al. ................. | 717/105 |
| 7,533,366 B2 * | 5/2009 | Gupta et al. ................... | 717/105 |
| 7,543,274 B2 * | 6/2009 | Hinchey et al. ................ | 717/123 |
| 7,640,251 B2 * | 12/2009 | Sundararajan et al. ............... | 1/1 |
| 7,694,272 B2 * | 4/2010 | Bronicki et al. .............. | 717/109 |
| 7,730,446 B2 * | 6/2010 | Anonsen et al. .............. | 717/104 |
| 7,752,606 B2 * | 7/2010 | Savage .......................... | 717/135 |
| 7,886,041 B2 * | 2/2011 | Outhred et al. ................ | 709/224 |
| 7,890,924 B2 | 2/2011 | Raffo | |
| 7,945,892 B1 * | 5/2011 | Kainz et al. ................... | 717/105 |

(Continued)

OTHER PUBLICATIONS

Matinlassi, "Comparision of software product line architecture design methods: COPA, FAST, FORM, KobrA and QADA", IEEE ICSE, pp. 1-10, 2004.*

(Continued)

*Primary Examiner* — Anil Khatri (74) *Attorney, Agent, or Firm* — Holland & Knight, LLP; Brian J. Colandreo, Esq.; Michael T. Abramson, Esq.

(57) ABSTRACT

A method and computer program product reads one or more specifications that define, at least in part, a software application. A data storage structure is generated for storing data of the software application. At least one unit of code is generated based, at least in part, upon one or more design elements within the one or more specifications. A first application is generated from the at least one unit of code and data storage structure.

24 Claims, 3 Drawing Sheets

U.S. PATENT DOCUMENTS

| | | | |
|---|---|---|---|
| 8,001,527 B1 | 8/2011 | Qureshi et al. | |
| 8,006,224 B2* | 8/2011 | Bateman et al. | 717/104 |
| 8,015,541 B1* | 9/2011 | Srinivasan et al. | 717/104 |
| 8,024,703 B2* | 9/2011 | Gerken et al. | 717/109 |
| 8,086,995 B2* | 12/2011 | Luo et al. | 717/105 |
| 8,103,536 B2* | 1/2012 | Green et al. | 705/7.27 |
| 8,117,597 B2* | 2/2012 | Shia | 717/123 |
| 2002/0091989 A1 | 7/2002 | Cole et al. | |
| 2004/0111428 A1 | 6/2004 | Rajan et al. | |
| 2005/0033588 A1 | 2/2005 | Ruiz et al. | |
| 2005/0144226 A1 | 6/2005 | Purewal | |
| 2005/0172263 A1 | 8/2005 | Hariharan et al. | |
| 2005/0172270 A1 | 8/2005 | Dathathraya et al. | |
| 2005/0210099 A1 | 9/2005 | Oswalt | |
| 2005/0235260 A1 | 10/2005 | Matsutsuka et al. | |
| 2007/0089103 A1 | 4/2007 | Iborra et al. | |
| 2008/0040364 A1 | 2/2008 | Li | |

OTHER PUBLICATIONS

Jiang et al, "Comparing design and code metrics for software quality prediction", ACM Promise, pp. 11-18, 2008.*

Oyamada et al, "Software performance estimation in MPSoC Design", IEEE, pp. 38-43, 2007.*

Popovici et al, "Platform based software design flow for heterogeneous MPSoC", ACM Trans. on Embedded Sys. vo. 7, No. 4, article 39, pp. 1-23, 2008.*

Jensen et al, "On the use of generic programming for automated refactoring and the introduction of design patterns", ACM GECCO, pp. 1341-1348, 2010.*

Giglielmo et al, "Model driven design and validation of embedded software", ACM AST, pp. 98-104, 2011.*

International Search Report with Written Opinion, dated Sep. 24, 2009, received in international patent application No. PCT/US09/53396, 9 pgs.

International Preliminary Report on Patentability with Written Opinion, mailed Feb. 24, 2011, received in international patent application No. PCT/US09/053396, 7 pgs.

Mano, Nobuoki, Modeling of Data-Processing Software for Generating and Reusing Their Programs, IEEE, 1988, pp. 231-240.

Solsi, et al., Simple Yet Complete Heuristics for Transforming Data Flow Diagrams into Booch Style Diagrams, Ada Letters, Mar./Apr. 1991, vol. XI, No. 2, pp. 115-127.

Conradi, et al., Information Model of a Compound Graph Representation for System and Architecture Level Design, IEEE, 1995, pp. 22-27.

Ray, Arnab, Architectural Interaction Diagrams: AIDs for System Modeling, IEEE, 2003, pp. 396-406.

Ji, et al., Interactive Software Architecture Design with Modeling & Simulation, ACM, 2004, pp. 305-306.

Abdi, et al., Automatic Generation of Equivalent Architecture Model from Functional Specification, ACM, 2004, pp. 608-613.

Abdi, et al., On Deriving Equivalent Architecture Model from System Specification, IEEE, 2004, pp. 322-327.

Ge, et al., An Architecture Modeling and Code Generation Framework for Configuration Management Systems, ACM, 2005, pp. 427-428.

Liu, et al., Mapping Concern Space to Software Architecture: A Connector-Based Approach, ACM, 2005, 5 pgs.

Mahfoudhi, et al., Towards a User Interface Generation Approach Based on Object Oriented Design and Task Model, ACM, 2005, pp. 135-142.

Rueher, et al., "Capturing Software Processes Through the Generated Objects", (1988), pp. 148-152.

* cited by examiner

METHOD AND SYSTEM FOR CONSTRUCTING A SOFTWARE APPLICATION FROM A COMPLETE AND CONSISTENT SPECIFICATION IN A SOFTWARE DEVELOPMENT PROCESS

TECHNICAL FIELD

This disclosure relates to constructing software and, more particularly, to automatically constructing application software from a specification.

BACKGROUND

The construction of software applications is time intensive and resource heavy. Companies often hire software developers to create and maintain software applications for use within their operations. For example, a manager in a medical facility may wish to utilize an application that automates the scheduling of medical procedures in order to save time and money. However, the manager may find that no suitable commercial application exists. In order to procure a suitable application, the manager and the medical facility may be forced to develop their own, custom application by hiring software developers to create the application.

The software development process will likely include, at a minimum, a specification capture phase where software requirements are gathered, a development phase where the software is written, and a test phase where the software is tested. The process is time consuming and costly, especially, as is the case, where a company has a need for multiple custom applications or requires modifications to a custom application. The natural result of the process will likely be a custom software application tailored to a specific need, but not one that is flexible or re-usable; the company will have to invest additional time and resources to make any changes to the custom application or to create a new application.

A system and method that can automate at least part of the software development process may speed the development cycle and require fewer resources to produce more flexible, re-usable results.

SUMMARY OF DISCLOSURE

In an embodiment, a method of constructing a software application includes: reading one or more specifications that define, at least in part, a software application; generating a data storage structure for storing data of the software application; generating at least one unit of code based, at least in part, upon one or more design elements within the one or more specifications; and constructing a first application from the at least one unit of code and data storage structure.

One or more of the following features may be included. Constructing the first application may include one or more of: identifying one or more process actions to be implemented in the first application; identifying one or more units of code associated with the one or more process actions; and creating at least one additional unit of code for the one or more process actions that invokes at least one of the one or more identified units of code. The one or more design elements may be selected from the group consisting of: a process definition that defines, at least in part, a process associated with the software application, wherein the process is one or more of: a process of which the software application is a part, and a process that is part of the software application; a process action that defines, at least in part, an action associated with a process; a data definition that defines, at least in part, data associated with the software application; a data relationship that defines, at least in part, a relationship between the data; a user interface definition that defines, at least in part, an interface to the software application; and a rule that is applied to at least one of the one or more design elements.

One or more of the following items may be generated: test cases for validating the first application; and test data for validating the first application.

One or more additional specifications that define, at least in part, the software application may be read. At least one additional data storage structure for storing data of the software application may be generated. At least one additional unit of code based, at least in part, upon one or more design elements within the one or more additional specifications may be generated. And the first application may be modified. Modifying the first application may include at least one operation selected from the group consisting of: constructing a second application including compiling the at least one additional units of code; adding the at least one additional unit of code to the first application; adding the at least one additional data storage structure to the first application; and reconstructing, at least in part, the first application based on the additional specifications wherein reconstructing the first application comprises compiling the at least one additional units of code.

An additional data storage structure for storing data of the software application may also be generated. An existing data storage structure for storing data of the software application may be modified. The data storage structure(s) may be defined, at least in part, by the one or more design elements. The one or more design elements may be selected from the group consisting of: a data element; a relationship between data elements; and an order for organizing data elements and relationships.

The at least one unit of code may be defined, at least in part, by the one or more design elements. The one or more design elements may be selected from the group consisting of: a data validation rule; a data derivation rule; a data access rule; a process action user interface element; a process action control rule; a process action entry condition; a process action exit condition; a process action data rule; and a process action exception handling rule.

One or more modified specifications may be read that modify, at least in part, the software application. At least one additional unit of code may be generated based, at least in part, upon one or more design elements within the one or more modified specifications. The software application may be modified based, at least in part, on the one or more modified specifications.

In another embodiment, a computer program product resides on a computer readable medium, having a plurality of instructions stored thereon which, when executed by a processor, cause the processor to perform operations including: reading one or more specifications that define, at least in part, a software application; generating a data storage structure for storing data of the software application; generating at least one unit of code based, at least in part, upon one or more design elements within the one or more specifications; and constructing a first application from the at least one unit of code and data storage structure.

One or more of the following features may be included. Constructing the first application may include one or more of: identifying one or more process actions to be implemented in the first application; identifying one or more units of code associated with the one or more process actions; and creating at least one additional unit of code for the one or more process actions that invokes at least one of the one or more identified units of code. The one or more design elements may be selected from the group consisting of: a process definition that defines, at least in part, a process associated with the software application, wherein the process is one or more of: a process of which the software application is a part, and a process that is part of the software application; a process action that defines, at least in part, an action associated with a process; a data definition that defines, at least in part, data associated with the software application; a data relationship that defines, at least in part, a relationship between the data; a user interface definition that defines, at least in part, an interface to the software application; and a rule that is applied to at least one of the one or more design elements.

One or more of the following items may be generated: test cases for validating the first application; and test data for validating the first application.

One or more additional specifications that define, at least in part, the software application may be read. At least one additional data storage structure for storing data of the software application may be generated. At least one additional unit of code based, at least in part, upon one or more design elements within the one or more additional specifications may be generated. And the first application may be modified. Modifying the first application may include at least one operation selected from the group consisting of: constructing a second application including compiling the at least one additional units of code; adding the at least one additional unit of code to the first application; adding the at least one additional data storage structure to the first application; and reconstructing, at least in part, the first application based on the additional specifications wherein reconstructing the first application comprises compiling the at least one additional units of code.

An additional data storage structure for storing data of the software application may also be generated. An existing data storage structure for storing data of the software application may be modified. The data storage structure(s) may be defined, at least in part, by the one or more design elements. The one or more design elements may be selected from the group consisting of: a data element; a relationship between data elements; and an order for organizing data elements and relationships.

The at least one unit of code may be defined, at least in part, by the one or more design elements. The one or more design elements may be selected from the group consisting of: a data validation rule; a data derivation rule; a data access rule; a process action user interface element; a process action control rule; a process action entry condition; a process action exit condition; a process action data rule; and a process action exception handling rule.

One or more modified specifications may be read that modify, at least in part, the software application. At least one additional unit of code may be generated based, at least in part, upon one or more design elements within the one or more modified specifications. The software application may be modified based, at least in part, on the one or more modified specifications.

BRIEF DESCRIPTION OF THE DRAWINGS

Like reference designators denote like elements in the drawings.

DETAILED DESCRIPTION OF THE PREFERRED EMBODIMENTS

Overview

As will be discussed below in greater detail, this disclosure may take the form of an entirely hardware embodiment, an entirely software embodiment or an embodiment containing both hardware and software elements. In a preferred embodiment, this disclosure may be implemented in software, which may include but is not limited to firmware, resident software, microcode, byte-code, script code, markup language code, etc.

Furthermore, this disclosure may take the form of a computer program product accessible from a computer-usable or computer-readable medium providing program code for use by or in connection with a computer or any instruction execution system. For the purposes of this description, a computer-usable or computer readable medium may be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a flash memory, a rigid magnetic disk and an optical disk. Current examples of optical disks may include, but are not limited to, compact disc—read only memory (CD-ROM), compact disc—read/write (CD-R/W) and DVD.

A data processing system and/or computing device suitable for storing and/or executing program code may include at least one processor coupled directly or indirectly to memory elements through a system bus. The memory elements may include local memory employed during actual execution of the program code, bulk storage, and cache memories.

Input/output or I/O devices (including but not limited to keyboards, displays, pointing devices, voice recognition, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Figure 1:
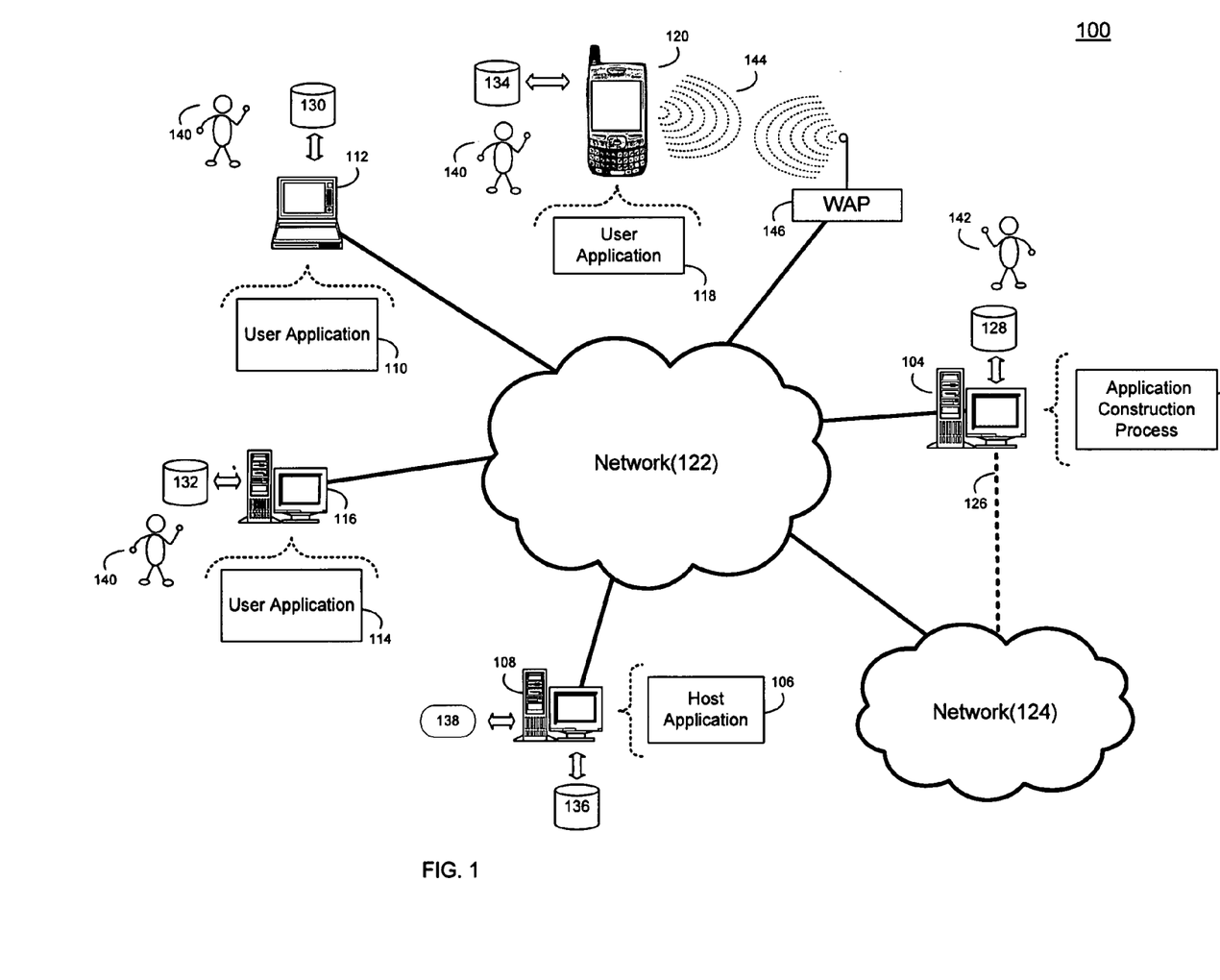
FIG. 1 is a diagrammatic view of an application construction process executed in whole or in part by a computer coupled to a distributed computing network.

FIG. 1 shows a method and system 100 for constructing a software application. Application construction process 102, which may be resident on and executed (in whole or in part) by server computer 104, is shown and may be operative to construct a software application. A software application may include, but is not limited to, a host application, such as host application 106, which may be resident on and executed (in whole or in part) by server computer 108. Server computer 108 may be a single server computer, a plurality of server computers, or a general purpose computer, for example. A software application may also include, but is not limited to, a user application, such as user application 110, resident on and executed by laptop computer 112, and/or user application 114, resident on and executed by desktop computer 116, and/or user application 118, resident on and executed by computing device 120. A software application, including user applications, such as user applications 110, 114, 118, and host applications, such as host application 106, may also reside on and be executed by a personal digital assistant (PDA), smartphone, cellular telephone, cable box, television, gaming console, office telephone, MP3 player, calculator, tablet PC, supercomputer, mainframe, minicomputer, bar code reader, RFID devices, or any other type of computing device. Additionally, a software application may employ a client-server architecture. For example, host application 106 may be a server software application and user applications 110, 114, 118 may be client software applications. As will be discussed below in greater detail, application construction process 102 may allow for the construction of a software application that may include a host application, such as host applications 106, and/or user applications, such as user applications 110, 114, 118.

Server computers 104, 108 may be coupled to distributed computing network 122 (e.g., the Internet). Server computers 104, 108 may be, for example, web servers running a network operating system, examples of which may include but are not limited to Microsoft Windows XP Server™, Unix™, OS/X™, or Redhat Linux™.

Network 122 may be coupled to one or more secondary networks (e.g., network 124), such as: a local area network; a wide area network; an internet; the world wide web; or an intranet, for example. Additionally/alternatively, server computers 104, 108 may be coupled to network 122 through secondary network 124, as illustrated with phantom link line 126. Although not shown, any computing device may also be coupled to network 122 through secondary network 124 though a link line, such as a link line shown by phantom link line 126.

The instructions and subroutines of application construction process 102, which may be stored on storage device 128 coupled to server computer 104, may be executed by one or more processors (not shown) and one or more memory architectures (not shown) incorporated into server computer 104. Additionally, the instructions and subroutines of user applications 110, 114, 118 may be stored on storage devices 130, 132, 134, respectively. Also, the instructions and subroutines of host application 106 may be stored on storage device 136, coupled to server computer 108. Storage devices 128, 130, 132, 134, 136 may include, but are not limited to, hard disk drives, tape drives, optical drives, RAID arrays, random access memories (RAM), read-only memories (ROM), compact flash (CF) storage devices, secure digital (SD) storage devices, and a memory stick storage devices. The instructions and subroutines of host application 106, user applications 110, 114, 118, and/or application construction process 102 may cause one or more computer processors to perform operations based on the instructions and subroutines.

Application construction process 102 and/or a software application may also access and make use of a data store, such as data store 138 coupled to server computer 108. Data store 138 may be a database, which may reside in a file or files on server computer 108. Server computer 108 may execute database software such as Microsoft SQL Server™, mySQL™ or Oracle Database 11g™, or any other form of database. Alternatively, data store 138 may be a custom database, such as a flat file database or an XML database. Although FIG. 1 shows data store 138 resident on server computer 108, data store 138 may reside on any computing device such as desktop computer 116, laptop computer 112, computing device 120, and/or server computer 104. Application construction process 102, and/or a software application including host application 106 and/or user applications 110, 114, 118, may access data store 138 remotely through Networks 122, 124, or directly if data store 138 is resident on a local computer. Although not shown, application construction process 102 and/or a software application including host application 106 or user applications 110, 114, 118 may access multiple data stores (not shown). The multiple data stores may be resident on a single computing device or on a plurality of computing devices.

Users, such as users 140, may access the software application (directly through network 122 or through secondary network 124) by interfacing with user applications 110, 114, 118 executed by various computing devices, examples of which may include but are not limited to: laptop computer 112, desktop computer 116, computing device 120, and server computer 104. Users 140 may also access the software application by interacting directly with host application 106 and/or application construction process 102 through a local computing device. User applications 110, 114, 118, host application 106, and/or application construction process 102 may include user interfaces, such as textual or graphical user interfaces, through which users 140 may access the software application. Furthermore, software application developer 142 may access application construction process 102 directly, by using server computer 104, or indirectly, by using another computing device (not shown).

The Application Construction Process

Figure 2:
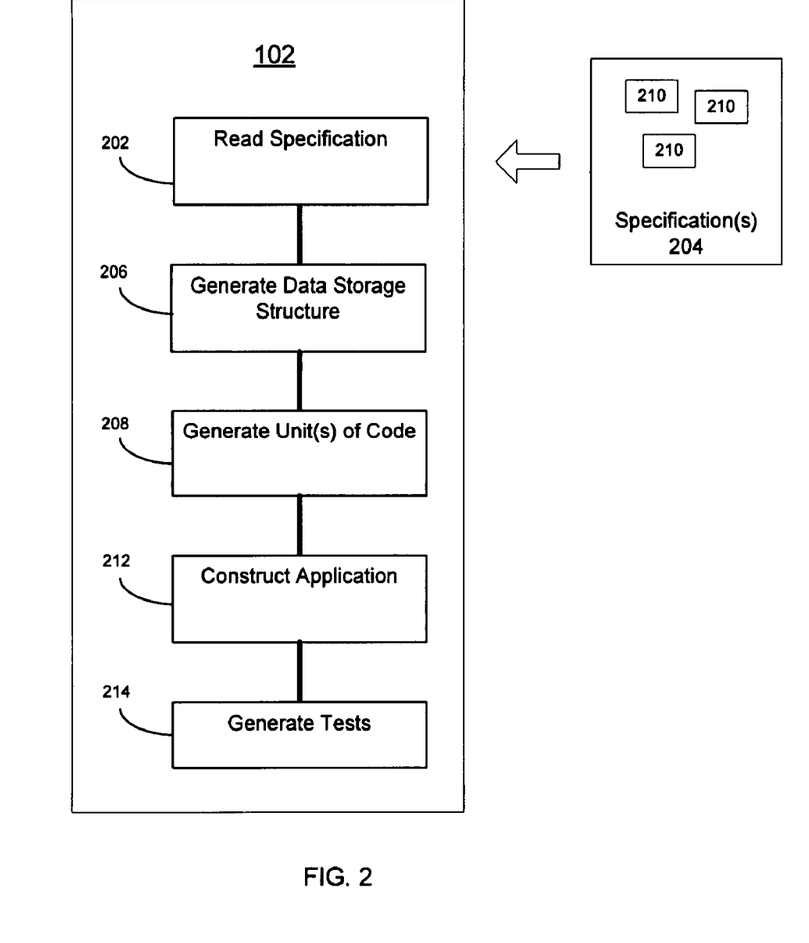
FIG. 2 is a flowchart overview of the application construction process of FIG. 1.

Referring also to FIG. 2, application construction process 102 may read 202 one or more specifications 204 that describe, at least in part, a software application, generate 206 a data storage structure for storing data of the software application, generate 208 at least one unit of code based, at least in part, upon one or more design elements 210 within the one or more specifications 204, and construct 212 a first application from the at least one unit of code and data storage structure.

Application construction process 102 may read 202 one or more specifications, such as specification 204, that describe, at least in part, a software application. Application construction process 102 may also read 202 multiple specifications 204. A specification may include data, documents, files, text, a propagated signal, a stream, or any form of data or information. A specification may be captured through a separate mechanism and reduced to a set of data that describes, in part, requirements for performing work to accomplish a goal. A specification, such as specification 204, may include, at least in part, requirements for a software application. Specification 204 may include, for example, requirements for a software application that describe at least part of a software application to be constructed 212. For example, specification 204 may include, among other elements, actions to be performed by the software application. Additionally or alternatively, specification 204 may include requirements and specifications for a process or method. For example, specification 204 may define, in part, operational goals (i.e., an operational goal of scheduling operations in a medical facility, or the goal of communicating to a group of individuals in an organization, for example) and/or a process or method to achieve those goals (i.e., one or more process actions, user interface definitions, and/or rules that may be used to schedule medical procedures and/or communicate to a group of individuals, for example). Further, specification 204 may contain, in part, other descriptions and/or definitions of an operation or a software application including, but not limited to, definitions of physical facilities, organizational charts, policies, functions, and/or communication standards. In an embodiment, specification 204 may define, in part, operating goals (i.e., an operating goal of maintaining the processing conditions of a refinery within standards for flow rates, pressures, and temperatures) and/or a process or method to achieve those goals, (i.e., one or more process actions, user interface definitions, and/or processing rules that may be used to monitor and adjust the processing conditions of a refinery and/or communicate to a group of individuals, for example). Further, specification 204 may contain, in part, descriptions and/or definitions of a software application including, but not limited to, definitions of processing functions, components to monitor, the location and nature of sensors, and so forth.

In a preferred embodiment, specification 204, may take the form of one or more electronic files containing specifications and/or design elements which may define the software application. A specification may also take other forms, such as a data stream, web service, database, XML file, HTML file, physical printout, or any other form of data or information that may describe a software application.

As stated, software application construction process 102 may read 202 specification 204. Reading 202 specification 204 may include loading all or part of the specification into a memory, such as a memory (not shown) coupled to server computer 104.

Specification 204 may include design elements, such as design elements 210. Design elements 210 may be atomic data, information, elements, processes, rules, and/or relationships, the collection of which make up, at least in part, specification 204. Design elements 210 may include a process definition that defines, at least in part, a process which employs the associated software application. The software application, such as host application 106 and/or user applications 110, 114, 118, may include the process steps which may be part of the process defined by design elements 210. For example, a software application that supports the process of managing the schedule of a medical facility may include process steps for scheduling a medical procedure. Alternatively, the software application may be or become part of the process defined by design elements 210. For example the process of scheduling a medical procedure within a medical organization may include or incorporate a software application that updates a calendar as part of the process of scheduling a medical procedure. A process associated with the software application may also include a process or method used within an operation, i.e. an operational process. An operational process may include work activities, procedures, and/or methods, for example, that may be used to achieve a goal. For example, a particular operational process may define the scheduling of a medical procedure. Design elements 210 may contain information that defines the scheduling process. Continuing the example, the information contained within design elements 210 may include information such as goals of the scheduling process (such as a minimum target of scheduled procedures), descriptions of the process, information about the process (such as commonly asked questions and answers), definitions of data used in the process such as types of patients, types of doctors, types of medical procedures, types of insurance, levels of care, procedure calendars, necessary forms, legal requirements, or any other information pertaining to the scheduling of a medical procedure.

Design elements 210 may also include process actions that define, at least in part, actions associated with a process, such as a process implemented in software, for example. A process action definition may also include information about the type of each process action. For example, a process action may be an action performed by a person alone, performed by a person using a computer, performed by a computer alone, performed by a person using a mobile device, etc. Although not required, the process actions may also define a sequence in which the actions are to take place in order to meet a goal of the software application. In the example of a medical procedure, process actions may include, but are not limited to: gathering patient information, which may be an action performed by a person using a computer, setting a date and time for the procedure, which may be an action performed by a person using a computer, performing the procedure, which may be an action performed by a person alone, providing post procedure care, which may be an action performed by a person alone, and/or scheduling follow up appointments, which may be an action performed by a person using a computer.

Design elements 210 may also include one or more data definitions that define, at least in part, data associated with the software application. A data definition may define data associated with specification 204. For example, data associated with a specification 204 for a medical procedure may include the name, address, and telephone number of a patient, the date and time of the procedure, medical insurance numbers, the name of the medical procedure, the name of one or more doctors, and/or any other data or information associated with a medical procedure, for example. A data definition may also include information about the type of data. Each datum may be a particular type of datum, for example, data that represents the name of a patient may be a string data type, the date of the procedure may be a date-time data type, the insurance policy number may be a numeric data type, etc. The data may include any type of data including simple data types, such as integers and characters, or complex data types, such as classes or databases, or any other type of data. The type of data may also include limits or restrictions of the data. For example, the length of data that represents the name of a patient may be limited to a maximum number of characters.

Design elements 210 may also include one or more data relationship definitions that define, at least in part, a relationship between the data. Data may be related to each other in various ways. A data relationship definition may also include information about the type of data relationship. For example, data may reference other data, data may link to other data, data may be identical to other data, data may be part of the same process, data may be part of the same user interface, data may be part of the same application, data may be dependant on each other, data may be used to generate or derive additional data, data may be an encoding of other data, data may be an input to a process action that may formulate additional output data, etc. The relationship between the data may be any type of data association or relationship. Additionally, data may be associated with other data via a data organization structure, such as a database, XML file, or other structured data organization. Design elements 210 may include a cardinality of the data relationship. For example, an occurrence of a first datum may be related to many occurrences of a second datum. Other cardinality relationships may include a many to one relationship, a one to one relationship, and a many to many relationship, for example. As a specific example, a first group of data may be one or more images taken from an echocardiogram procedure. A second group of data may be information about the patient who underwent the echocardiogram procedure. One or more design elements 210 may define a relationship between the first and second groups of data; the relationship may be an association between the patient information and the one or more echocardiogram images, a cardinality of one to many. Although a specific example is described, one skilled in the art will recognize that a design element, such as design elements 210, may include any type of data relationship.

Design elements 210 may also include one or more user interface definitions that define, at least in part, an interface to the software application. A specification, such as specification 204, may define a user interface. Design elements 210 may provide a user interface definition. A user interface definition may include one or more definitions of one or more user interface ("UI") elements of a user interface. The UI elements, as a whole or in part, may define and/or describe a portion of a user interface or a complete user interface. For example, design elements 210 may include one or more UI elements that define, at least in part, a type of a UI instance, including, but not limited to, a window, a web page, a report, etc. Further, design elements 210 may include one or more UI elements that define, at least in part, the content of a UI instance, such as a button portion of a web page or window. The definition of the button portion may include information about the size of the button, the location of the button, the text associated with the button, the color of the button, the functionality of the button, or any other information relating to the display and/or functionality of the button. Design elements 210 may include UI elements including, but not limited to: a window, a text box, a panel, a label, a tab panel, a scroll box, a dial, a menu, a menu item, a toolbar, a drop-down box, a checkbox, a radio button, a graphic or picture, etc.

Design elements 210 may include various types of user interface information and/or user interface definitions. For example, one or more design elements may include a definition of a complete user interface. As another example, one or more software design elements may include a definition of one or more UI elements, such as a UI button or UI menu. As another example, one or more design elements may include information about one or more user interfaces and/or information about one or more UI elements, such as a user interface color or a UI element location, for example. As another example, design elements 210 may include information about one or more UI elements including, but not limited to, a display format of a UI element. A display format may include the formatting of a web page, report, email, or data to be presented or captured. A display format may also include the order or sequence in which data is to be presented, the data relationships between the data presented (e.g. the cardinality relationship between data), or whether a datum is to be input by the user or displayed by the software application. In general, design elements 210 may include information about any type of display formatting of a UI element of the software application.

Design elements 210 may also include one or more rules or rule definitions that may be applied to one or more design elements of specification 204. For example, design elements 210 may define a rule or set of rules that verifies or validates other design element(s) 210. One or more rules may be used to validate and/or check, at least in part, a design element, such as design elements 210 contained in specification 204. A rule may, for example, be used to validate and/or check a process action. The one or more rules may contain one or more rules and/or limits to which the process action must adhere. For example, the one or more rules may contain a specific order of process actions to be taken when scheduling a medical procedure. The one or more rules may be used to ensure that the process actions adhere to the specific order required, for example. One or more rules may also provide information used to validate and/or check a process action. For example, if a process action includes the action of setting a date and time for a medical procedure, the one or more rules may be used to ensure that the setting of a date and time takes place and is included as part of the process action. Additionally or alternatively, the one or more rules may be used to ensure that the date and time of the medical procedure are a valid date and time, for example. The one or more rules may also provide information used to validate and/or check a data definition. For example, if a data definition defines a medical insurance number, the one or more rules may be used to ensure that the insurance number is a valid insurance number, for example. As another example, the one or more rules may be used to ensure that the insurance number conforms to a particular pattern, such as a maximum length, a required combination of alpha characters and numeric character, or a required pattern of spaces or dashes between numbers, for example. The one or more rules may also provide information used to validate and/or check one or more data relationships between data. For example, if a data relationship requires that a first data and second data are identical, the one or more rules may include the requirement that the first and second data be identical, or may provide information used to ensure that the first and second data are identical, for example. The rules may also create additional restrictions upon a data relationship. For example, if data represents a hysterectomy, there may be a requirement within specification 204 and/or design elements 210 that an associated patient is a female patient. Accordingly, design elements 210 may include a rule used to ensure that the patient associated with the hysterectomy is a female patient, for example.

Design elements 210 may also include an order of presentation of data elements in a user interface. The order of presentation may include information about an organization of data elements or relationships between data. The information may include a method of sorting, filtering, displaying, or processing data elements or relationships between data elements, for example. As an illustration, the order or sequence of presentation may direct a software application, such as host application 106 and/or user applications 110, 114, 118, to present data in an ascending order, for example. Alternatively, the order or sequence of presentation may direct a software application to filter data where the value of the data is less than a particular threshold.

Design elements 210 may also include various other elements and/or rules associated with the software application. These elements may include: a data validation rule that may be used to validate data of the software application; a data derivation rule that may be used to derive data (e.g. an algorithm to calculate a total cost as a product of a unit price times a quantity); a data access rule that may define access to data, such as read access, write access, etc.; a process action user interface element that may define, at least in part, a user interface element associated with a process action; a process action entry condition that may define a condition that must be met in order to start or trigger a process action; a process action exit condition that may define a condition required to exit, terminate, or end a process action; a process action data rule that may define a rule associated with data associated with a process action—the process action data rule may include qualification, filtering, and/or sorting rules, for example; and a process action exception handing rule that may handle an exception associated with a process action.

Various other data may also be included within design elements 210. Such data may include an organization chart. The organizational chart may define an organizational structure and reporting hierarchy of an organization, for example. An organizational chart may also include information about elements within the organization chart. For example, if the organizational chart contains information about people within an organization, design elements 210 may include information about the people within the organization including name, location, contact information, position information, etc.

Design elements 210 may also contain information about a work location that identifies, at least in part, a physical work facility. The work location may include facility information such as address, size, cost, capacity, occupancy, ownership, and/or any other information associated with a physical work facility. Application construction process 102 may capture the work location, and any information associated with the work location as at least part of specification 204 and/or design elements 210

Application construction process 102 may use the information relating to an organization chart, a physical work facility and/or people within an organization to define and/or restrict access to a process action and/or data. A process action may be applicable to certain elements within an organization, but not applicable to other elements within an organization. For example, if a process action defines the scheduling of a surgery, the process action may be applicable for a physical work facility that includes an operating room, for an organization that includes a surgery group, and/or for a user who is a surgeon. Accordingly, application construction process 102 may provide the process action only for facilities (operating rooms), organizational groups (surgery departments), and/or individual users (surgeons) for which the process action is applicable. A software application constructed 212 by application construction process 102 may, for example, restrict access to the process action for facilities without operating rooms, organizations without surgery departments, and/or individuals who are not surgeons. Additionally or alternatively, software application constructed 212 by application construction process 102 may, for example, withhold (i.e. not show or not present) the process action to facilities without operating rooms, organizations without surgery departments, and/or individuals who are not surgeons Application construction process 102 may generate 206 a data storage structure for storing data of the software application. A software application, such as host application 106 and/or user applications 110, 113, 118, constructed 212 by application construction process 102, for example, may access a data storage structure for storage or retrieval of data. The software application may store data or data elements in a data repository, such as data store 138 residing on server computer 108. As stated, data store 138 may be a database, which may reside in a file or files on server computer 108. Alternatively, data store 138 may be a custom database, such as a flat file database or an XML database. Although FIG. 1 shows data store 138 resident on server computer 108, data store 138 may reside on any computing device such as desktop computer 116, laptop computer 112, computing device 120, and/or server computer 104. In general, data store 138 may be any form of data store resident on any appropriate device. Application construction process 102 may generate 206 a data storage structure for storing data of the software application. The data storage structure may be, for example, a database, a set of files, a set of database tables, or any form of data storage structure.

Application construction process 102 may generate 206 a data storage structure based upon specification 204 and/or design elements 210. Design elements 210 may include one or more data definitions. Design elements 210 may also include one or more data, one or more data elements, one or more orders or sequences of data or data elements, and/or data relationships between data elements and their cardinality. Application construction process 102 may use these software design elements to generate 204 a data storage structure. For example, the data definitions and data relationships may facilitate the formation of a relational database by defining, for example, the structure of the relational database. As such, application construction process 102 may recognize that the data definitions, data, data relationships, and cardinality of the data relationships lend themselves to the formation of a relational database, and application construction process 102 may generate 206 a relational database based on data normalization and relational database design. For example, a data element may be combined with all other data elements with which it has one-to-one cardinality into a relational table. In addition, application construction process 102 may generate indices for the relational database table to facilitate the access of data elements within the relational database table, as required for the relational database table based upon the order of presentation required by the user interface for the data elements in the table, for example. As another example, in an atomic data structure, each data element may be its own table in which instances of that data element are stored or, from which, retrieved. Further, each data relationship may be its own table, in which instances of that data relationship are stored or, from which, retrieved. Although the previous examples illustrate the formation of a relational database and an atomic data structure, one skilled in the art will recognize that application construction process 102 may generate 206 any form of data storage structure for storing data, and application construction process 102 may use any data, data relationship, or data element to generate 206 any form of data storage structure.

Application construction process 102 may generate 208 at least one unit of code based, at least in part, upon one or more design elements within the one or more specifications. Design elements 210 may, for example, define at least one unit of code. A unit of code may include an elemental unit of software code. The code may be any type of code including, but not limited to: high level code such as Java, Ruby, C, or C++, for example; object oriented code; assembly code; byte-code; machine code, script code; etc. Some or all of design elements 210 may be represented by or include a unit of code. Likewise, a unit of code may include at least enough code to adequately represent at least one design element, such as one of design elements 210. For example, if a design element includes a data definition that calculates an age of a patient, a unit of code may include software code that calculates, based on the patient's birth date and the present date, the age of the patient. The code may, for example, use an "int" data structure to represent the age of the patient. The unit of code may also optionally include any additional functionality relating to the age of the patient. For example, the unit of code may provide a function that classifies the patient as a minor based on the age of the patient. The unit of code may use any code mechanism (i.e., functions, methods, native data structures, classes, recursions, encryption, etc.) to represent a design element. As an additional illustration, if design elements 210 include one or more data relationships, a unit of code may include software code that represents, instantiates, and/or creates software functionality associated with the one or more data relationships, such as reading or creating an instance of the data relationship. One skilled in the art will recognize that software code may represent data relationships in various ways including, but not limited to: references, classes, links, addresses, and memory allocations, for example. As an additional illustration, if design elements 210 include one or more user interface definitions, a unit of code may include the software that represents, instantiates, and/or creates the user interface element defined by the one or more user interface definitions. For example, if design elements 210 include a definition of a UI button, a unit of code may contain the code necessary to define and instantiate the UI button. As an additional example, if design elements 210 include one or more rules or rule definitions, a unit of code may include, for example, software code that uses the one or more rules to test, verify, and/or validate at least part of a specification (such as specification 204), data, and/or a software application (such as host application 106 and/or user applications 110, 114, 118). Testing, verifying, and/or validating may, for example, ensure that goals of the software design and/or software application are met. As an additional example, if design elements 210 include an order or sequence of presentation required by the user interface, a unit of code may contain software code that implements the order or sequence of presentation. For example, if the order or sequence of presentation required by the user interface includes a sorting index, the unit of code may implement the sorting index by providing/including a software sorting algorithm. As an additional example, if design elements 210 include a process definition, a unit of code may contain software code that implements the process defined by the process definition. In a preferred embodiment, every UI element, data element, and/or rule may generate its own unit of code so that only one unit of code exists for each individual design element 210.

Application construction process 102 may generate 208 at least one process action unit of code based, at least in part, upon one or more design elements, such as design elements 210. In a preferred embodiment, application construction process 102 may include methods and processes that take at least one design element as an input and generate 208 at least one unit of code as an output. For example, each design element 210 that specifies a rule, such as a data validation rule that a patient gender must be male or female, may be generated 208 as one or more units of code. For each design element 210 that specifies a file, each file may be generated 208 as one or more units of code based on the structure of data content for the file. The structure of data content for the file may, for example, be captured within the design element(s) 210 that specifies the file. Using XML as an example, design elements 210 may include an XML file format definition. Accordingly, application construction process 102 may generate 204 an XML file, one or more units of code to read an XML file, and/or one or more units of code to write to an XML file.

Each design element 210 that specifies a UI format, such as a report, web page, window, and so forth, may also be generated 208 as one or more units of code. If a design element 210 specifies or requires data access, application construction process 102 may generate 208 one or more units of code for each read and/or write data access. The units of code for each read and/or write access may access data in data store 138, for example, using the form, such as an XML string, a relational table, or other means of data access, appropriate to the generated 206 data structure. Although the previous examples illustrate the formation of units of code for rules, file reads and writes, UI formats, and database reads and writes, etc., one skilled in the art will recognize that application construction process 102 may generate 208 one or more units of code for buttons, tabs, keystroke commands, entry conditions, exit conditions, and any other particular action or design element 210. In each case, application construction process 102 may generate 208 a process action unit of code that may combine additional/other units of code necessary for each process action of the software application. If, for example, design elements 210 include a process action where a person interacts with a computer, such as a process action for the scheduling of a medical procedure, application construction process 102 may generate 208 the process action code to invoke or include other units of code necessary for the scheduling of the medical procedure. For example, the process action code may invoke or include other units of code for validating the patient information, determining the availability of an operating theater, determine the availability of the surgeon, and/or scheduling of the medical procedure.

Units of code may be stored and re-used for future use. For example, application construction process 102 may generate 208 at least one unit of code and store the at least one unit of code in a unit of code repository. Application construction process 102 may, for example, store the at least one unit of code in data store 138. Application construction process 102 may then retrieve and utilize one or more units of code from the repository.

Application construction process 102 may construct 212 a first application from the at least one unit of code and/or the at least one data storage structure. Application construction process 102 can recognize, for example, that a process action is a computer-only process action and determine whether the computer-only process action is input-driven (having an input file to process) or output-driven (having no input file but creating an output file or report). For an input-driven process action, application construction process 102 may construct 212 an application that executes one or more of the generated 208 units of code to read the input, executes one or more of the generated 208 units of code to validate data contained in the file, and executes one or more of the generated 208 units of code to write valid data to the generated 206 data storage structure. For an output-driven process action, application construction process 102 may construct 212 an application that executes or includes one or more generated 208 units of code to read data from the generated 206 data storage structure, executes or includes one or more generated 208 units of code for derived or calculated data contained in the file, and executes or includes one or more generated 208 units of code to read data from the generated 206 data storage structure unit of code to write the output file. If design elements 210 require a particular order or sequence, application construction process 102 may construct 212 an application that performs actions according to the particular order or sequence.

Further, application construction process 102 can recognize, for example, that a process action is a process action that includes a person using a computer and/or includes user input or user interaction with a UI. For example, application construction process 102 can recognize, for example, that the process action has a window or web page UI element. For each UI element, application construction process 102 may construct 212 an application that may execute the generated 208 UI format unit of code, execute the generated 208 units of code required to validate data input by a user, execute the generated 208 unit of code to read data from the generated 206 data storage structure, and execute the generated 208 unit of code to write data to the generated 206 data storage structure. If design elements 210 require a particular order or sequence, application construction process 102 may construct 212 an application from generated 208 units of code that perform actions according to the particular order or sequence.

Application construction process 102 may construct 212 a first application from the at least one unit of code and/or the at least one data storage structure. As stated, specification 204 may include a mechanism (such as design elements 210) that describes, in part, requirements for constructing a first application. Specification 204 may include design elements 210 that may further define various elements of a software design and/or a first application. Application construction process 102 may generate 206 one or more data storage structures and may generate 208 one or more units of code based, in part, upon software design elements 210. As shown, the one or more units of code and the one or more data storage structures may be ultimately derived from specification 204. Accordingly, application construction process 102 may construct 212 a first application based, at least in part, upon the one or more units of code and/or the data storage structure. Application construction process 102 may include the one or more units of code and/or the data storage structure definitions as inputs and may produce a first application as an output. In one embodiment, application construction process 102 may compile the units of code in order to construct 212 a first application. Compilation is one method of constructing the first application, however, other methods may be employed. For example, the units of code may be script code that does not need to be compiled. Alternatively, the units of code may be pre-compiled. In general, application construction process 102 may utilize any method of software construction in order to construct 212 a first application. One skilled in the art will recognize that application construction process 102 may construct 212 an application for any specific computing device and its system software.

The first application may, for example, provide a software solution or achieve a goal through software based upon specification 204 and/or design elements 210. The first application may include multiple processes and applications. For example, the first application may include host application 106, user applications 110, 114, 118, or any combination of host application 106 and user applications 110, 114, 118. The first application may also provide an automated software solution. For example, if specification 204 and design elements 210 contain information that defines an application for scheduling a medical procedure, application construction process 102 may read 202 specification 204 and design elements 210, may generate 206 one or more data storage structures that may store data necessary to perform the scheduling of a medical procedure, may generate 208 one or more units of code necessary for the scheduling of a medical procedure, and/or may construct 212 an application to automate the process of scheduling a medical procedure. Continuing the previous example, the data storage structure may store any data (i.e., schedule information, patient information, doctor information, etc.) pertaining to the scheduling of a medical procedure. The units of code may, for example, provide elemental code and mechanisms for performing the scheduling of the medical procedure including, but not limited to: code to implement a schedule, code to add the medical procedure to a schedule, a UI to display/manipulate the schedule, code to communicate (e.g. via email) the schedule to users, etc. And application construction process 102 may construct 212 an application for the scheduling of a medical procedure that incorporates, at least in part, the data storage structure and/or the units of code.

Application construction process 102 may construct 212 a fully automated application. For example, application construction process 102 may construct 212 a first application that automatically schedules medical procedures. Additionally, application construction process 102 may construct a semi-automated or manual application that requires input from a user, such as users 140 and/or developer 142 to schedule medical procedures.

Application construction process 102 may also generate 214 test cases and test data for validating the first application. Test cases or information about test cases may be included within specification 204 and/or within design elements 210. Design elements 210 may include rules, process definitions, process actions, and/or data definitions, for example. The information contained in design elements 210 may be used to generate 214 test cases and test data. The test cases may, for example, define tests used to validate a software application such as host application 106 and user applications 110, 114, 118. The test cases may also include data used as inputs and/or outputs of the test cases. The data and the test cases may be used to perform any kind of testing including, but not limited to: functional testing, performance testing, reliability testing, certification testing, regression testing, smoke testing, conformance testing, compatibility testing, etc. The test cases may provide test coverage so that, when the test cases are executed, host application 106 and/or user applications 110, 114, 118 are fully or partially tested.

Figure 3:
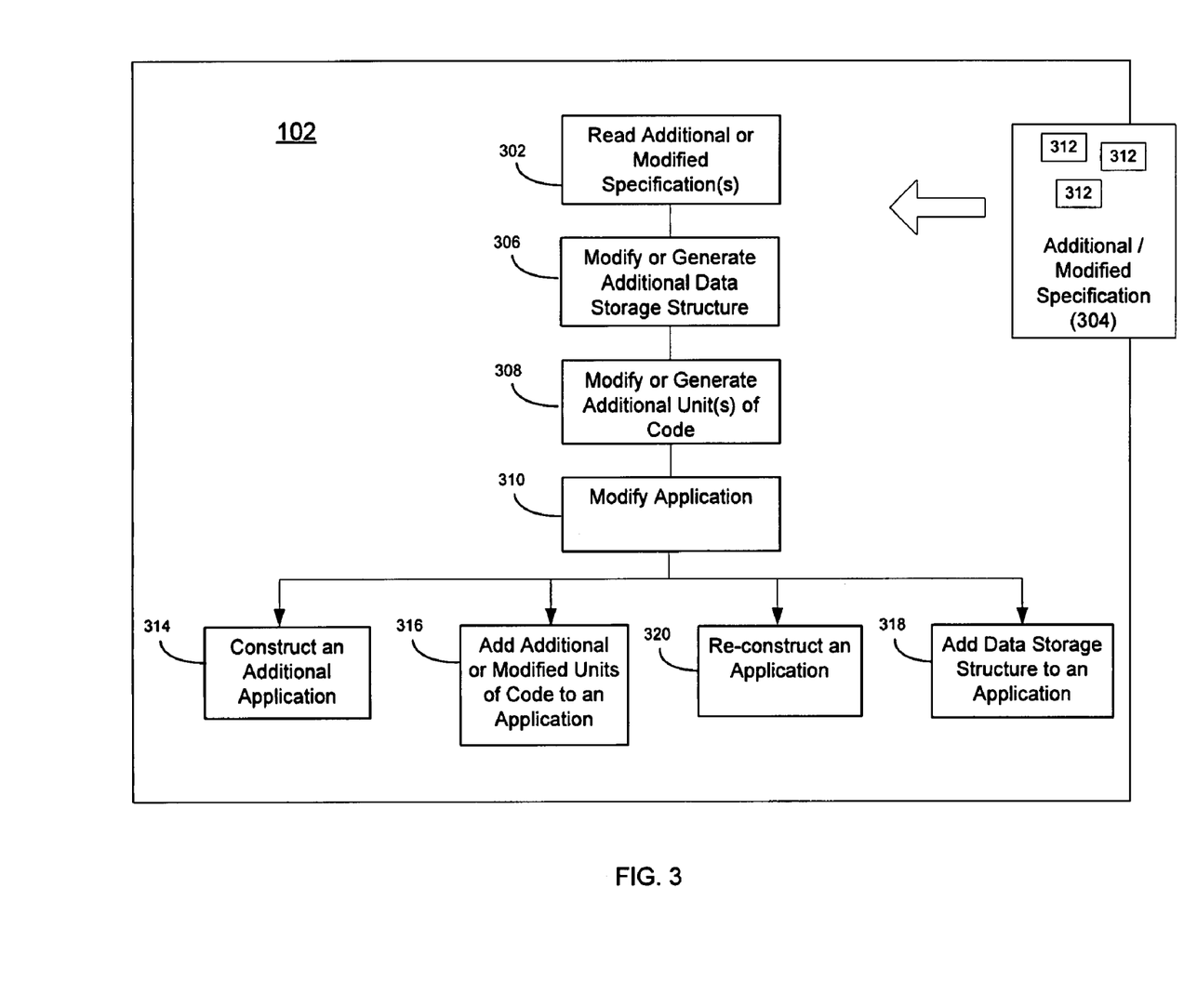
FIG. 3 is a flowchart of an aspect of the application construction process of FIG. 1.

Referring to FIG. 3, application construction process 102 may also modify an existing application. Application construction process 102 may read 302 one or more modified specifications 304, or one or more additional specifications 304 that describe, at least in part, the software application; generate 306 at least one additional or modified data storage structure for storing data of the software application; generate 308 at least one additional or modified unit of code based, at least in part, upon one or more elements within the one or more additional specifications; and modify 310 the first application. If a first application exists (such as host application 106 or user applications 110, 114, 118) application construction process 102 may modify 310 the first application. For example, if developer 142 wishes to modify a first application rather than creating a new application from scratch, developer 142 may modify specification 204 or add an additional specification to specification 204 to create a modified specification 304. Application construction process 102 may, for example, read 302 additional or modified specifications 304. The additional or modified specifications 304 may contain additional or modified design elements 312. The additional or modified specifications 304 and/or the additional or modified design elements 312 may contain changes or modifications to be made to the first application.

Based on the additional or modified specifications 304 and the additional or modified design elements 312, application construction process 102 may generate 306 one or more additional data storage structures. Additionally or alternatively, application construction process 102 may modify 306 one or more existing data storage structures. Application construction process 102 may also generate 308 one or more additional units of code based upon the additional or modified specifications 304 and/or additional or modified design elements 312. The additional or modified data storage structures and/or the additional units of code may then be used to modify 308 the first application, thus creating a modified application. The modified application may incorporate the functionality, requirements, modifications and/or changes included in the additional or modified specifications 304.

Application construction process 102 may modify 308 the first application in various ways. Application construction process 102 may, for example, construct 314 a second application by compiling the at least one additional or modified units of code. The additional or modified units of code generated 308 from the additional or modified design elements may be compiled to create a second application, for example. The second application may be an additional host application, similar to host application 106, or an additional user application, similar to user applications 110, 114, 118, or a combination of additional host applications and/or user applications. As one skilled in the art will recognize, compiling the at least one additional units of code may be performed by any form of application construction including, but not limited to: software compilation, software assembly, software script construction/assemblage, etc.

Application construction process 102 may also add 316 the at least one additional or modified unit of code to the first application and/or add 318 the at least one additional or modified data storage structure to the first application. For example, a unit of code may represent an addition or modification to the first application. If so, the modification 308 of the first application may be accomplished by adding 316 the unit to the first application. Application construction process 102 may add 316 the additional or modified unit of code to the first application via any method of incorporating the additional or modified unit of code into the first application. For example, if the additional or modified unit of code is a script, application construction process 102 may simply include the script in the first application. If the additional or modified unit of code is high level code, for example, application construction process 102 may compile or re-compile at least part of the first application. If the additional or modified unit of code is, for example, interpreted code, application construction process 102 may insert the unit of code into the first application. In general, application construction process 102 may use any appropriate method of modifying 310 the first application. Additionally, application construction process 102 may include at least one additional or modified data storage structure in the first application by any appropriate means, including, but not limited to: compilation, re-compilation, creation of a new database, modification of an existing database, etc.

Application construction process 102 may also modify 310 the application by adding or modifying 318 a data storage structure. Application construction process may, for example, modify 306 an existing data storage structure or generate 306 an additional data storage structure (e.g. a database, file, or data store, for example) based on modified specification 304 and/or modified design elements 312. Application construction process 102 may modify 310 a first application by replacing, appending, adding to, and/or removing the data storage structure(s) of the first application. Application construction process 102 may, for example, replace the data storage structure of the first application with the additional or modified data storage structure generated 306 by application construction process 102. Application construction process 102 may also, for example, modify 310 the data storage structure of the first application with the additional or modified data storage structure generated 306 by, for example, appending the modified data storage structure to the data storage structure of the first application.

Application construction process 102 may also reconstruct 320, at least in part, the first application based on the additional or modified specifications 304 wherein reconstructing the first application comprises compiling the at least one additional or modified units of code. The modification 310 of the first application may necessitate a complete or partial reconstruction 320 of the first application. If so, application construction process 102 may partially or completely reconstruct 320 the first application. For example, application construction process 102 may reconstruct 320 the first application by incorporating the additional or modified unit of code into the first application, and compiling or re-compiling at least part of the first application. In general, application construction process 102 may use any appropriate method of reconstructing 320 the first application.

A number of implementations have been described. Nevertheless, it will be understood that various modifications may be made. Accordingly, other implementations are within the scope of the following claims.

What is claimed is:
1. A method of constructing a software application, comprising:
reading one or more complete and consistent specifications that define, at least in part, a software application;
generating by a processor a data storage structure for storing data of the software application automatically based, at least in part, upon one or more design elements within the one or more complete and consistent specifications;
generating by the processor at least one unit of code automatically based, at least in part, upon the one or more design elements within the one or more complete and consistent specifications; and
constructing by the processor a first application from the at least one unit of code and data storage structure, wherein constructing the first application includes one or more of:
identifying one or more process actions to be implemented in the first application;
identifying one or more units of code associated with the one or more process actions; and
creating at least one additional unit of code for the one or more process actions that invokes at least one of the one or more identified units of code.

2. The method of claim 1 wherein the one or more design elements is selected from a group consisting of:
a process definition that defines, at least in part, a process associated with the software application, wherein the process is one or more of:
a process of which the software application is at least a part; and
a process that is part of the software application;
a process action that defines, at least in part, an action associated with the process;
a data definition that defines, at least in part, data associated with the software application;
a data relationship that defines, at least in part, a relationship between the data;
a user interface definition that defines, at least in part, an interface to the software application; and
a rule that is applied to at least one of the one or more design elements.

3. The method of claim 1 further comprising generating items selected from a group consisting of: test cases for validating the first application; and test data for validating the first application.

4. The method of claim 1 further comprising:
reading one or more additional specifications that define, at least in part, the software application;
generating at least one additional data storage structure for storing data of the software application;
generating at least one additional unit of code based, at least in part, upon one or more design elements within the one or more additional specifications; and
modifying the first application.

5. The method of claim 4 wherein modifying the first application includes at least one operation selected from a group consisting of:
constructing a second application including compiling the at least one additional units of code;
adding the at least one additional unit of code to the first application;
adding the at least one additional data storage structure to the first application; and
reconstructing, at least in part, the first application based on the additional specifications wherein reconstructing the first application comprises compiling the at least one additional units of code.

6. The method of claim 4 further comprising: generating an additional data storage structure for storing data of the first application.

7. The method of claim 4 further comprising: modifying an existing data storage structure for storing data of the first application.

8. The method of claim 1 wherein the data storage structure is defined, at least in part, by the one or more design elements.

9. The method of claim 8 wherein the one or more design elements are selected from a group consisting of: a data element; a relationship between data elements; and an order for organizing data elements and relationships.

10. The method of claim 1 wherein the at least one unit of code is defined, at least in part, by the one or more design elements.

11. The method of claim 1 wherein the one or more design elements is selected from a group consisting of: a data validation rule; a data derivation rule; a data access rule; a process action user interface element; a process action control rule; a process action entry condition; a process action exit condition; a process action data rule; and a process action exception handling rule.

12. The method of claim 1 further comprising:
modifying one or more specifications to modify, at least in part, the software application;
reading the one or more modified specifications;
generating at least one additional unit of code based, at least in part, upon the one or more design elements within the one or more modified specifications; and
modifying the software application.

13. A computer program product residing on a non-transitory computer readable medium having a plurality of instructions stored thereon which, when executed by a processor, cause the processor to perform operations:
reading one or more complete and consistent specifications that define, at least in part, a software application;
generating a data storage structure for storing data of the software application automatically based, at least in part, upon one or more design elements within the one or more complete and consistent specifications;
generating at least one unit of code automatically based, at least in part, upon the one or more design elements within the one or more complete and consistent specifications; and
constructing a first application from the at least one unit of code and data storage structure, wherein constructing the first application includes one or more of:
identifying one or more process actions to be implemented in the first application;
identifying one or more units of code associated with the one or more process actions; and
creating at least one additional unit of code for the one or more process actions that invokes at least one of the one or more identified units of code.

14. The computer program product of claim 13 wherein the one or more design elements is selected from a group consisting of:
a process definition that defines, at least in part, a process associated with the software application, wherein the process is one or more of:
a process of which the software application is at least a part; and
a process that is part of the software application;
a process action that defines, at least in part, an action associated with the process;
a data definition that defines, at least in part, data associated with the software application;
a data relationship that defines, at least in part, a relationship between the data;
a user interface definition that defines, at least in part, an interface to the software application; and
a rule that is applied to at least one of the one or more design elements.

15. The computer program product of claim 13 wherein the operations further comprise generating items selected from a group consisting of: test cases for validating the first application; and test data for validating the first application.

16. The computer program product of claim 13 wherein the operations further comprise:
reading one or more additional specifications that define, at least in part, the software application;
generating at least one additional data storage structure for storing data of the software application;
generating at least one additional unit of code based, at least in part, upon the one or more design elements within the one or more additional specifications; and
modifying the first application.

17. The computer program product of claim 16 wherein modifying the first application includes at least one operation selected from a group consisting of:
constructing a second application including compiling the at least one additional units of code;
adding the at least one additional unit of code to the first application;
adding the at least one additional data storage structure to the first application; and
reconstructing, at least in part, the first application based on the additional specifications wherein reconstructing the first application comprises compiling the at least one additional units of code.

18. The computer program product of claim 16 wherein the operations further comprise: generating an additional data storage structure for storing data of the first application.

19. The computer program product of claim 16 wherein the operations further comprise: modifying an existing data storage structure for storing data of the first application.

20. The computer program product of claim 13 wherein the data storage structure is defined, at least in part, by the one or more design elements.

21. The computer program product of claim 20 wherein the one or more design elements are selected from a group consisting of: a data element; a relationship between data elements; and an order for organizing data elements and relationships.

22. The computer program product of claim 13 wherein the at least one unit of code is defined, at least in part, by the one or more design elements.

23. The computer program product of claim 13 wherein the one or more design elements is selected from a group consisting of: a data validation rule; a data derivation rule; a data access rule; a process action user interface element; a process action control rule; a process action entry condition; a process action exit condition; a process action data rule; and a process action exception handling rule.

24. The computer program product of claim 13 wherein the operations further comprise:
modifying one or more specifications to modify, at least in part, the software application;
reading the one or more modified specifications;
generating at least one additional unit of code based, at least in part, upon the one or more design elements within the one or more modified specifications; and
modifying the software application.

* * * * *